US008824271B2

(12) United States Patent
Chun et al.

(10) Patent No.: US 8,824,271 B2
(45) Date of Patent: Sep. 2, 2014

(54) ODFM RECEIVER

(75) Inventors: Young-Il Chun, Seongnam-si (KR);
Chang-Ik Hwang, Seongnam-si (KR);
Jae-Jun Ban, Seongnam-si (KR)

(73) Assignee: FCI Inc., Seongnam-Si, Gyeonggi-Do (KR)

( * ) Notice: Subject to any disclaimer, the term of this patent is extended or adjusted under 35 U.S.C. 154(b) by 7 days.

(21) Appl. No.: 13/618,391

(22) Filed: Sep. 14, 2012

(65) Prior Publication Data

US 2013/0107695 A1    May 2, 2013

(30) Foreign Application Priority Data

Oct. 28, 2011    (KR) .................. 10-2011-0111010

(51) Int. Cl.
*H04J 11/00*    (2006.01)
*H04L 27/26*    (2006.01)
(52) U.S. Cl.
CPC ............ *H04L 27/263* (2013.01); *H04L 27/265* (2013.01)
USPC ........................................................ 370/210
(58) Field of Classification Search
USPC ......... 370/203, 204–215, 229–240, 310–394, 370/395.1, 395.3, 395.4, 395.41, 395.42, 370/395.5, 395.52, 431–529
See application file for complete search history.

(56) References Cited

U.S. PATENT DOCUMENTS

| 2004/0081131 | A1* | 4/2004 | Walton et al. | 370/344 |
| 2008/0112479 | A1* | 5/2008 | Garmany et al. | 375/231 |
| 2009/0231992 | A1* | 9/2009 | Kim et al. | 370/210 |
| 2010/0232395 | A1* | 9/2010 | McLeod et al. | 370/335 |
| 2010/0278288 | A1* | 11/2010 | Panicker et al. | 375/343 |
| 2011/0188597 | A1* | 8/2011 | Agee et al. | 375/267 |
| 2011/0255577 | A1* | 10/2011 | Agee et al. | 375/219 |
| 2013/0022158 | A1* | 1/2013 | Panicker et al. | 375/343 |
| 2013/0279614 | A1* | 10/2013 | Walton et al. | 375/260 |

OTHER PUBLICATIONS

OFDM Symbol Boundary Detection and Carrier Synchronization in DVB-T Baseband Receiver Design, publication date Jun. 1, 2006, 60 pages.

* cited by examiner

*Primary Examiner* — Jung-Jen Liu
(74) *Attorney, Agent, or Firm* — Lowe Hauptman & Ham, LLP

(57) ABSTRACT

The present invention relates to an orthogonal frequency-division multiplexing receiver, and more particular to an orthogonal frequency-division multiplexing receiver including an FFT/IFFT operating core and a scheduler. In order to simultaneously share the FFT/IFFT operating core, the scheduler manages input/output timings of FFT/IFFT operations and control signals. The FFT/IFFT operating core supports decimation-in-time (DIT) and decimation-in-frequency (DIF) FFT/IFFT operations at the same time.

8 Claims, 4 Drawing Sheets

| Symble | Mode | Status Name | Blocks | FFT size | Method | IN | OUT |
|---|---|---|---|---|---|---|---|
| → | M0 | FFT_MAIN | Main OFDM Symbol | 1024 | DIT-FFT | RI | MO |
| ⇢ | M1 | FFT_PRE_CID | Co-Channel Interference Detector | 1024 | DIT-FFT | RI | MO |
| ⋯► | M2 | IFFT_IFO | Integer Frequency Offset Estimator | 1024 | DIT-IFFT | CI | MO |
| ⇡ | M3 | IFFT_CE | Channel Estimator | 1024 | DIT-IFFT | CI | MO |
| ⇡ | M4 | FFT_CE | Channel Estimator | 1024 | DIT-FFT | CI | MO |
| ⇢ | M5 | IFFT_FTSYNC | Fine Symbol Position Estimator | 1024 | DIT-IFFT | CI | MO |
| → | M6 | FFT_POST_CID | Co-Channel Interference Detector | 1024 | DIT-FFT | CI | MO |
| → | M7 | FFT_MFD | Doppler Frequency Estimator | 32 | DIT-FFT | CI | SO |

FIG. 3

ODFM RECEIVER

CROSS REFERENCE TO RELATED APPLICATION

This application claims the priority of Korean Patent Application No. 10-2011-0111010 filed on Oct. 28, 2011 in the KIPO (Korean Intellectual Property Office), the disclosure of which is incorporated herein in their entirety by reference.

FIELD OF THE INVENTION

The present invention relates to an orthogonal frequency-division multiplexing (ODFM) receiver being capable of sharing a signal FFT/IFFT core, and more particularly to an ODFM receiver being capable of sharing a signal FFT/IFFT core through scheduling, thereby performing operations.

BACKGROUND OF THE INVENTION

Fast Fourier Transform (FFT) is a Fast operating algorithm of a Discrete Fourier Transform (DFT) for transforming data in a time domain into the data in an Frequency domain. The FFT is widely used in designs of digital signal processing and high-speed wired and wireless digital communication systems. Cores which are used for performing FFT and inverse FFT operations can be used in an ODFM system. The full name of the OFDM is Orthogonal Frequency Division Multiplexing, which is an orthogonal frequency division multiplexing algorithm for high-speed data transmission. The OFDM is a manner that uses multiple carrier waves to parallel process input data with a high transfer rate into the data having a lower transfer rate and a number thereof being the same to the number of the carrier waves, and the data are carried on the carrier waves to realize the transmission. Because the modulation of said OFDM employs multiple subcarriers, the hardware design thereof becomes difficult due to a number of the subcarriers increasing. Moreover, the orthogonalities between the subcarriers are difficult to maintain, so it is also difficult to design. The OFDM is implemented by a Discrete Fourier Transform (DFT), and the hardware design utilizes the FFT algorithm. A single memory structure for maintaining a smaller size of the hardware and a usage of butterfly operations have be proposed for the FFT processes, which are the most complex part in the OFDM system.

However, as described above, the proposed structure requires more computing cycles; thus, it is difficult to obtain a higher processing speed. Moreover, a drawback of requiring a higher operating frequency also exists. In an Field of high-speed processing requirements, pipeline structures are utilized to solve the drawback and to obtain a higher processing speed. The FFT/IFFT cores with the pipeline structure have manners of MDC (Multi-path Delay Commutator), SDC (Single-path Delay Commutator), SDF (Single-path Delay Feedback), MDF (Multi-path Delay Feedback). A hardware complexity of the whole structure and data throughput are determined depending on the structure of each of the FFT/IFFT cores.

In recent years, structures employing the pipeline structure combining with parallel processing techniques have been proposed to increase the data throughput. In this case, the more number of parallel paths, the data sampling frequency in each path is fewer, but processing units and memory for performing the operations are also increased at the same time. Thus, it causes a significant increase in hardware costs.

Therefore, it is difficult to decide a suitable structure and the parallel structures according to the desired data throughput and the hardware complexity. Moreover, applications of various algorithms that utilize FFT/IFFT operations to improve the performance of the ODFM receiver are constrained due to the limited factor on the hardware.

SUMMARY OF THE INVENTION

In order to solve the above-mentioned shortcomings, an objective of the present invention is to provide an ODFM receiver, which can realize share an FFT/IFFT core through scheduling when multiple blocks of the ODFM receiver need to perform FFT/IFFT operations.

To achieve the foregoing objective, an ODFM receiver provided in the present invention includes an FFT/IFFT operating core and a scheduler. The scheduler manages input/output timings of FFT/IFFT operations and control signals for simultaneously sharing the FFT/IFFT operating core, in which the FFT/IFFT operating core simultaneously supports a decimation-in-time (DIT) FFT/IFFT operation and a decimation-in-frequency (DIF) FFT/IFFT operation.

In the present invention, interface specifications in the FFT/IFFT operating core interfacing with the scheduler are used for sending and receiving signals via RI, SI, SO, and EO ports.

Further, the FFT/IFFT operations received by the scheduler are divided into an acquisition state and a tracking state, and an FFT for a main OFDM symbol (FFT_MAIN) operation, an FFT for Pre-Sync CID (FFT for Co-Channel Interference detection before OFDM Sync; FFT_PRE_CID) operation, and an IFFT for integer frequency offset estimation (IFFT_IFO) operation are requested from the scheduler in the acquisition state, and an FFT_MAIN operation, an IFFT for channel estimation (IFFT_CE) operation, an FFT for channel estimation (FFT_CE operation), an IFFT for fine time synchronization (IFFT_FTSYNC) operation, an FFT for Post-Sync CID (FFT for Co-Channel Interference detection after OFDM Sync; FFT_POST_CID) operation, and an FFT for measurement of frequency Doppler (FFT_MFD) operation are requested from the scheduler in the tracking state.

In the present invention, the FFT_PRE_CID operation in the acquisition state is utilized for a co-channel interference estimation, and the IFFT_IFO operation is utilized for an integer frequency offset estimation, and the FFT_PRE_CID operation and the IFFT_IFO operation are performed through sharing an FFT/IFFT operating core.

In the ODFM receiver of the present invention, for a channel estimation to simultaneously operate three FFT/IFFT operations, the single FFT/IFFT operation core is shared in an OFDM symbol for processing DIT-FFT, DIF-IFFT, DIT-FFT operations in turn, and an operating clock over 4 times of an FFT input data rate is used.

In the present invention, for calculating an Fine symbol positioning value to processing an IFFT operation, the single FFT/IFFT operation core is shared in an OFDM symbol for processing DIT-FFT, DIF-IFFT, DIT-FFT operations in turn, and an operating clock over 6 times of an FFT input data rate is used.

In addition, in the present invention, when the FFT/IFFT operating core performs an operation, the scheduler makes an additional FFT operation can be performed in a nonworking interval corresponding to a working interval of an FFT size*¾. Furthermore, the additional FFT operation performed through the scheduler can perform N-point FFT operations.

According to the characteristics of the present invention, the ODFM receiver of the present invention that has an effect that sharing an FFT/IFFT core can be realized by using the scheduler when the blocks that need to perform the FFT/IFFT operations are too much.

In addition, because of sharing an FFT/IFFT operating core, a logic size of the ODFM receiver does not need to increase so as to be more efficient in terms of cost effectiveness.

DESCRIPTION OF THE DRAWINGS

FIG. 3 is a chart illustrating information of each of the FFT/IFFT operations.

DETAILED DESCRIPTION OF THE PREFERRED EMBODIMENTS

Reference will now be made in detail to the present preferred embodiment of the invention, example of which is illustrated in the accompanying drawings.

Figure 1:
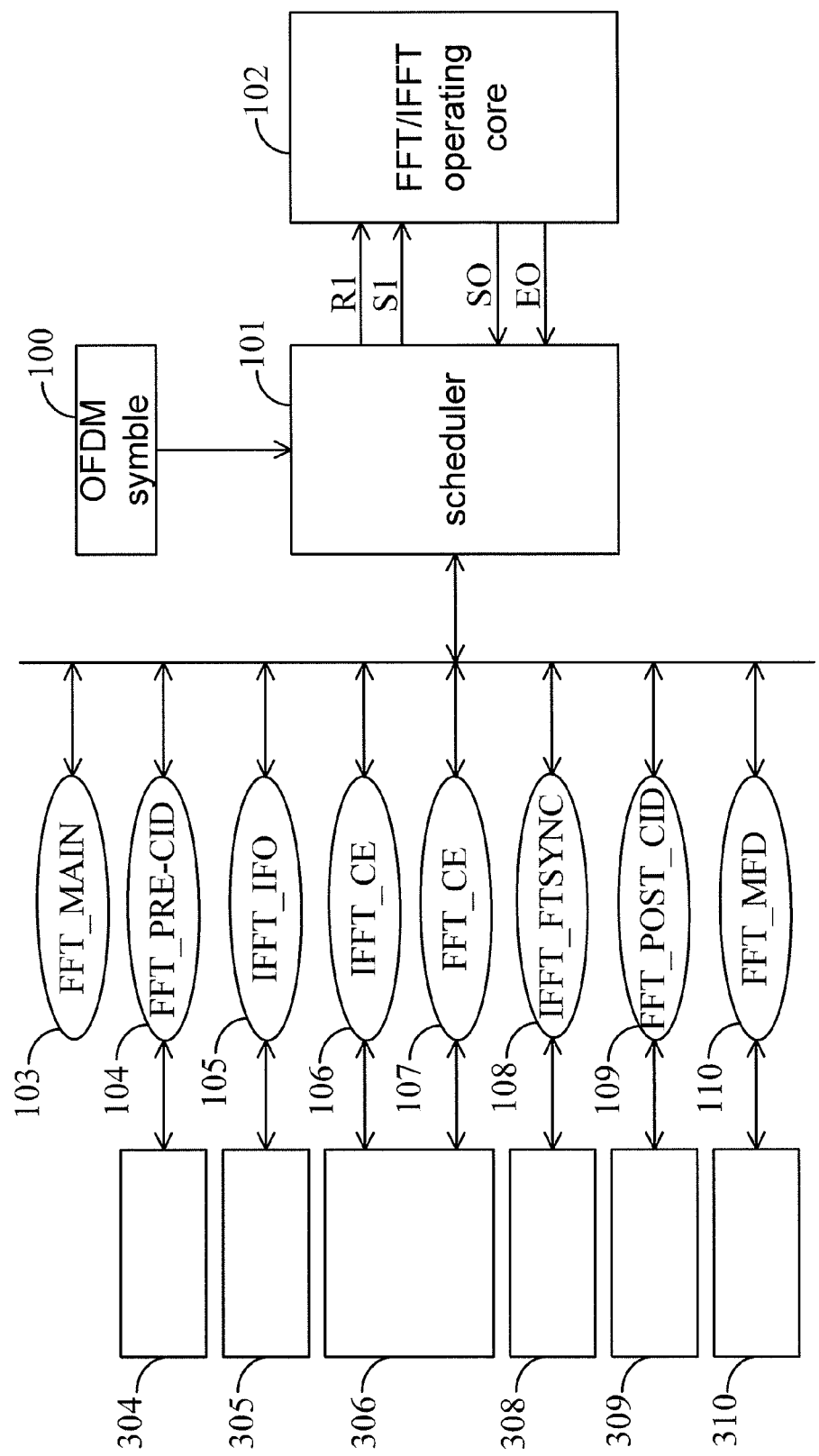
FIG. 1 is a schematic drawing illustrating a structure of an ODFM receiver according to the present invention.

FIG. 1 is a schematic drawing illustrating a structure of an ODFM receiver according to the present invention.

As shown in FIG. 1, the ODFM receiver according to the present invention includes an FFT/IFFT operating core 102 and a scheduler 101. The FFT/IFFT operating core 102 is a core of the FFT/IFFT operations that supports manners of Decimation In Time (DIT) and Decimation In Frequency (DIF) at the same time. The core is a transformation of the conventional pipeline FFT/IFFT core structures. In general, an input of a DIT-FFT operation is in a permuted order, and an output thereof is in a natural order. An input of a DIF-FFT operation is in a natural order, and an output thereof is in a permuted order. When the core simultaneously supports DIT and DIF, an output of the FFT can be served as a next input of the FFT to transmit without an additional buffer, thereby being able to realize successively performing the FFT operations. The ODFM receiver of the present invention employing the FFT/IFFT operating core 102, which utilizes the above-mentioned manner, uses an operating clock over 4 times of an FFT input data rate. During an OFDM symbol period, three FFT/IFFT operations can be performed within a cycle of 4*FFT size+FFT core latency (within several clocks). Moreover, if more FFT/IFFT operations need to be added according to a Functional structure of the receiver, it can be achieved through high-speed operating clocks more than 6 times or 8 times of the FFT input data rate. Moreover, when the FFT/IFFT operating core performs an operation, the additional FFT operation can be performed in a nonworking interval corresponding to a working interval of the FFT size*¾.

As shown in FIG. 1, in accordance with the structure of the ODFM receiver of the present invention, an OFDM symbol 100 and various FFT/IFFT operations (103 to 110) are input into the scheduler 101. The scheduler 101 receives and then processes them, and it interfaces with the FFT/IFFT operating core 102. In the following, the scheduler 101 interfacing with the FFT/IFFT processing core 102, and the FFT/IFFT operations will now be described in detail with reference to FIG. 1.

Figure 4:
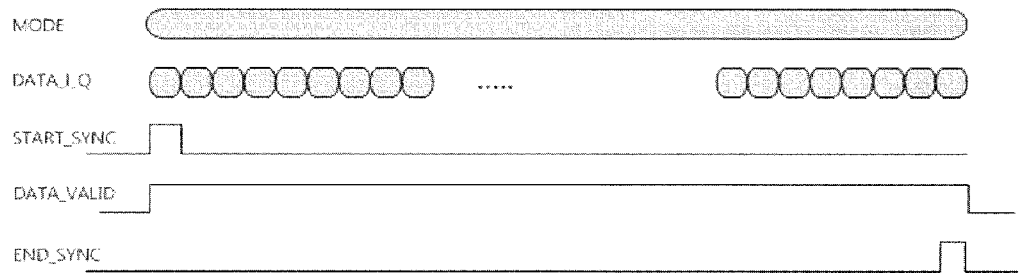
FIG. 4 is a schematic drawing illustrating definitions of interface specifications between the scheduler and the FFT/IFFT operating core according to the ODFM receiver of the present invention.

Firstly, the interface specifications in the scheduler 101 of the present invention interfacing with the FFT/IFFT operating core 102 are used for sending and receiving signals via RI, SI, SO, and EO ports. RI (Rx Main OFDM Symbol Input) herein is utilized to storage dedicated inputs, which are time-domain sample data being the same size as the FFT and being slowly input in ⅙ of the operating clock frequency, and the shared FFT/IFFT inputs of each assigned interval are input through the SI (Sharing Input) port. Timing specifications of the interfaces of SI, SO, EO are shown in FIG. 4.

Next, please continue to refer to FIG. 1, overall states of the ODFM receiver according to the present invention can be divided into an acquisition state and a tracking state. Meanwhile, the FFT/IFFT operations which are received by the scheduler 101 of the ODFM receiver have FFT_MAIN 103, FFT_PRE_CID 104, IFFT_IFO 105, IFFT_CE 106, FFT_CE 107, IFFT_FTSYNC 108, FFT_POST_CID 109, and FFT_MFD 110. FFT_MAIN 103, FFT_PRE_CID 104, and IFFT_IFO 105 are requested from the scheduler 101 in the acquisition state. FFT_MAIN 103, IFFT_CE 106, FFT_CE 107, IFFT_FTSYNC 108, FFT_POST_CID 109, and FFT_MFD 110 are requested from the scheduler 101 in the tracking state.

In the acquisition state, FFT_PRE_CID 104 requests the FFT operation from a co-channel interference estimator 304 first, thereby quickly estimating the information of co-channel interference. Because it is operated before the beginning of a symbol timing synchronization (sync) of the OFDM receiver, the FFT operation is performed after the OFDM symbol 100 with a size of N points is stored in an input buffer at any position. When the co-channel interference estimation is completed and then the OFDM symbol timing synchronization is completed, an integral frequency offset estimator 305 is activated. After the integer frequency offset estimator (305) performs a main FFT operation (FFT_MAIN), a correlation between the known signals is obtained, and an integer frequency offset can be estimated from the IFFT operation (IFFT_IFO) of that information. Meanwhile, the FFT_PRE_CID operation and the IFFT_IFO operation are performed through sharing an FFT/IFFT operating core 102.

Figure 2:
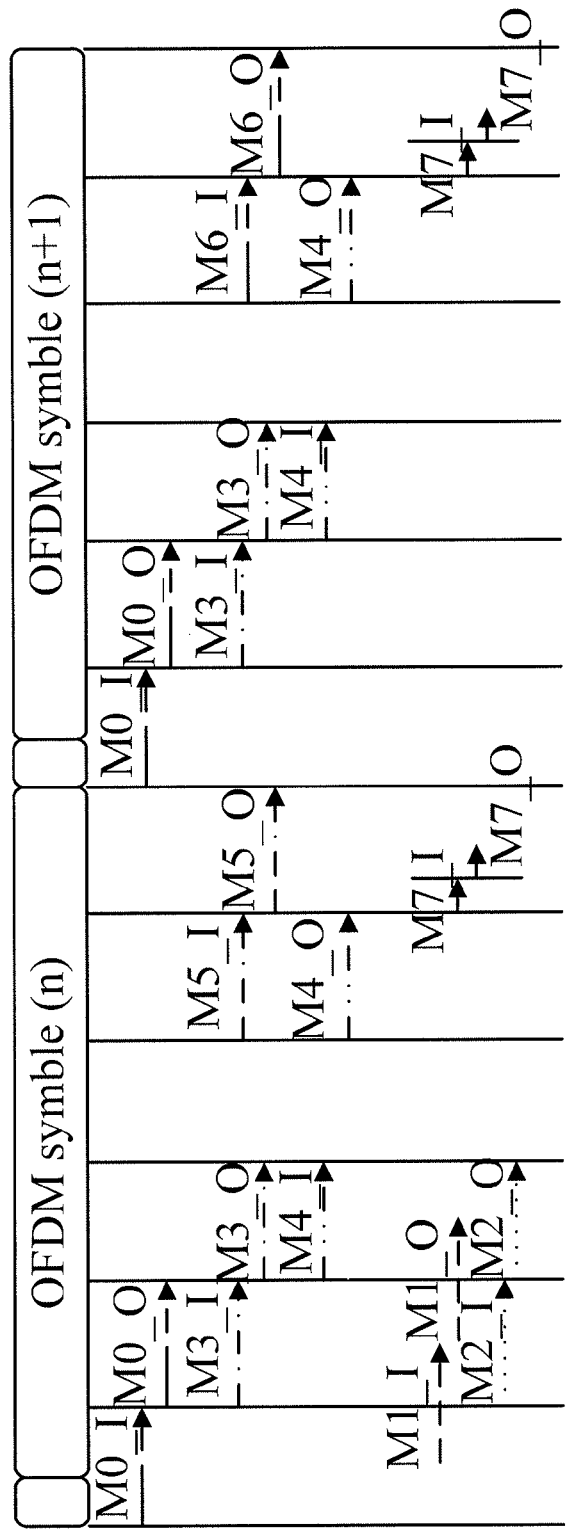
FIG. 2 is a schematic drawing illustrating a manner of using an FFT/IFFT operating core to schedule the plurality of FFT/IFFT operations within an OFDM symbol.

In the following, the FFT/IFFT operations will now be described in detail with reference to FIG. 2 and FIG. 3. FIG. 2 is a schematic drawing illustrating a manner of using an FFT/IFFT operating core 102 to schedule the plurality of FFT/IFFT operations within an OFDM symbol 100. FIG. 3 is a chart illustrating information of each of the FFT/IFFT operations. The chart records sizes of the FFT/IFFT operations respectively used by blocks of the ODFM receiver, and records DIT-DIF methods and information of input/output port. In addition, the FFT/IFFT processing core (102) is activated according to mode information (M0~M7) appointed by the scheduler 101. As shown in FIG. 2 and FIG. 3, the modes between the scheduler 101 and the FFT/IFFT operating core 102 are defined for the FFT/IFFT operations. Firstly, FFT_PRE_CID 104 is defined as mode 1. (Hereinafter, mode 1 is called M1 for short. An input of M1 is named M1_I, and an output of the M1 is named M1_O) In the M1_I interval, the OFDM symbols 101 read from the input buffer is input into the FFT/IFFT processing core 102, and an operated result is output to the M1_O interval. M1_O and M1_I can be located in arbitrary positions in the OFDM symbol 100, and independently occupy the FFT/IFFT processing core 102. When the operation of the co-channel interference estimation is completed, the FFT/IFFT processing core 102 is no longer occupied.

The main FFT operation (FFT_MAIN), which is performed at the beginning of the OFDM symbol, is stored into the input buffer with an FFT size. The operation is read form the M0_I interval and then is input to the FFT/IFFT operating core 102, and the output is obtained in the M0_O interval. In the integer frequency offset estimator 305, the output data is processed in the output interval M0_O of FFT_MAIN103. As to IFFO_IFO, the mode between the scheduler and the FFT/IFFT operating core 102 is defined as M2. The input interval of IFFT_IFO is named M2_I, and the output interval of IFFT_IFO is named M2_O. Moreover, the operated result of IFFT_IFO is transmitted to the integer frequency offset estimator 305 for estimating the integer frequency offset.

The state of the ODFM receiver is in the tracking state when the acquisition state of the ODFM receiver is completed, and the FFT/IFFT operations of FFT_PRE_CID and IFFT_IFO are no longer performed. Therefore, the intervals of M1_I, M1_O, M2_I, and M2_O are no longer occupied by the FFT/IFFT operating core 102.

The output of FFT_MAIN is used for generate Channel Frequency Response (CFR) information in the channel estimator 306, and then Channel Impulse Response (CIR) is obtained through the IFFT operation (IFFT_CE) of the CFR information. Then, after removing the noise out of the normal CIR information, the final channel can be estimated through the FFT operation (FFT_CE) again. The operations of FFT_MAIN103, IFFT_CE106, FFT_CE107 for estimating the channels are performed in order of DIT FFT→DIF IFFT→DIT FFT, and an operating clock over 6 times of the FFT input data rate is used. The single FFT/IFFT operation core 102 can be shared in the OFDM symbol 100 for estimating the channels. In this case, it can be successively processed without an additional buffer in a middle stage. Referring to FIG. 3, for example, the M3_I interval becomes the input interval of IFFT_CE; the M3_O interval becomes the output interval of IFFT_CE; the M4_I interval becomes the input interval of FFT_CE; and the M4_O interval becomes the output interval of FFT_CE.

The fine symbol position estimator 308 realizes finely tracking a start position of the main FFT for performing IFFT operation (IFFT_FTSYNC) by continuously observing the moving of the CIR information. In the beginning of the output interval (M4_O) of FFT_CE, according to the request of the scheduler, the data calculated independently by the fine symbol position estimator 308 is temporarily stored into the storage. Then, the input of IFFT_FTSYNC108 is transmitted to the FFT/IFFT operating core 102 in the M5_I interval. The operated result of IFFT_FTSYNC is output to the M5_O interval and transmitted to the fine symbol position estimator 308.

The Doppler frequency estimator 310 performs FFT_MFD 110 for estimating a Doppler frequency. The estimated information of the channels is gathered to a time axis for performing the FFT operation (FFT_MFD), and the Doppler frequency is estimated through the result. The size of the FFT for estimating the Doppler frequency is smaller than the size of the main FFT. FFT_MFD operation utilizes an internal stage of the FFT/IFFT processing core 102 without working at the beginning of the output interval M5_O of IFFT_FTSYNC, so as to add an additional FFT operation. M7_I is the input interval of FFT_MFD, and M7_O is the output interval of FFT_MFD. In this case, in order to solve the problem with regard to an overlapping between the output interval (M5_O) of IFFT_FTSYNC and an occupied time of the output port, an Extra Output (EO port) outputs a result.

For the co-channel interference estimation in the tracking state, the co-channel interference estimator 309 also requires the FFT operation (FFT_POST_CID). The operation intervals (M5_I and M5_O) of IFFT_FTSYNC can not occupy every symbol, and the operation interval of FFT_POST_CID uses unoccupied symbol intervals. M6_I is the input interval of FFT_POST_CID, and M6_O is the output interval of FFT_POST_CID.

FIG. 4 is a schematic drawing illustrating definitions of interface specifications between the scheduler and the FFT/IFFT operating core according to the ODFM receiver of the present invention. As shown in FIG. 4, in accordance with the ODFM receiver of the present invention, related signals of the FFT operations between the scheduler 101 and each of the blocks 304, 305, 306, 308, 309, and 310; and between the scheduler 101 and the FFT/IFFT operating core 102 consist of control signals of MODE, START_SYNC, END_SYNC, and DATA_VALID, DATA_I, and DATA_Q. The beginnings and ends of the inputs and outputs of each of the blocks can be seen through the signals of START_SYNC, END_SYNC in a high level (1). MODE herein indicates mode information of FIG. 3.

The present specification and drawings depict the embodiment employing the ODFM receiver of the present invention, and depict the method of sharing the FFT/IFFT operating core 102 by using the clock rate over six times of the FFT input data rate. The applications of the present invention are diverse depending on types of the blocks of the FFT/FIFT operations used in the acquisition and tracking states of the ODFM receiver. The applications are also diverse depending on how to determine the relationships with regard to the multiples of the operating clocks, and it is not limited by that.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. An ODFM receiver, comprising:
   an FFT/IFFT operation core; and
   a scheduler, the scheduler managing input/output timings of FFT/IFFT operations and control signals for simultaneously sharing the FFT/IFFT operating core, wherein the FFF/IFIFE operating core simultaneously supports a decimation-in-time (DIT) FFT/IFFT operation and a decimation-in-frequency (DIF) FFT/IFFT operation;
   wherein interface specifications in the FFT/IFFT operating core interfacing with the scheduler are used for sending and receiving signals via Rx Input (RI), Sharing Input (SI), Sharing Output (SO), and Extra Output (EO) ports;
   wherein for a channel estimation to simultaneously operate three FFT/IFFT operations, the single FFT/IFFT operation core is shared in an OFDM symbol for processing DIT-FFF, DIF-IFFT, DIT-FFT operations in turn, and an operating clock over 4 times of an FFT input data rate is used.

2. The ODFM receiver of claim 1, wherein the FFT/IFFT operations received by the scheduler are divided into an acquisition state and a tracking state, and an FFT for a main OFDM symbol (FFT_MAIN) operation, an FFT for Pre-Sync CID (FFT for Co-Channel Interference detection before OFDM Sync; FFT_PRE_CID) operation, and an IFFT for integer frequency offset estimation (IFFT_IFO) operation are requested from the scheduler in the acquisition state, and an FFT_MAIN operation, an IFFT for channel estimation (IFFT_CE) operation, an FFT for channel estimation (FFT_CE operation), an IFFT for fine time synchronization (IFFT_

FTSYNC) operation, an FFT for Post-Sync CID (FFT for Co-Channel Interference detection after OFDM Sync; FFT_POST_CID) operation, and an FFT for measurement of frequency Doppler (FFT_MFD) operation are requested from the scheduler in the tracking state.

3. The ODFM receiver of claim 2, wherein the FFT_PRE_CID operation in the acquisition state is utilized for a co-channel interference estimation, and the IFFT_IFO operation is utilized for an integer frequency offset estimation, and the FFT_PRE_CID operation and the IFFT_IFO operation are performed through sharing an FFT/IFFT operating core.

4. The ODFM receiver of claim 1, wherein for calculating an Fine symbol positioning value to processing an IFFT operation, the single FFT/IFFT operation core is shared in an OFDM symbol for processing DIT-FFT, DIF-IFFT, DIT-FFT operations in turn, and an operating clock over 6 times of an FFT input data rate is used.

5. The ODFM receiver of claim 1, wherein when the FFT/IFFT operating core performs an operation, the scheduler makes an additional FFT operation can be performed in a nonworking interval corresponding to a working interval of an FFT size*¾.

6. The ODFM receiver of claim 5, wherein the additional FFT operation performed through the scheduler can perform N-point FFT operations.

7. The ODFM receiver of claim 1, wherein the RI is utilized to storage dedicated inputs, which are time-domain sample data being the same size as an FFT and being slowly input in ⅙ of an operating clock frequency.

8. The ODFM receiver of claim 1, wherein the SI is utilized to receive shared FFT/IFFT inputs of each assigned interval.

* * * * *